Figure 1:
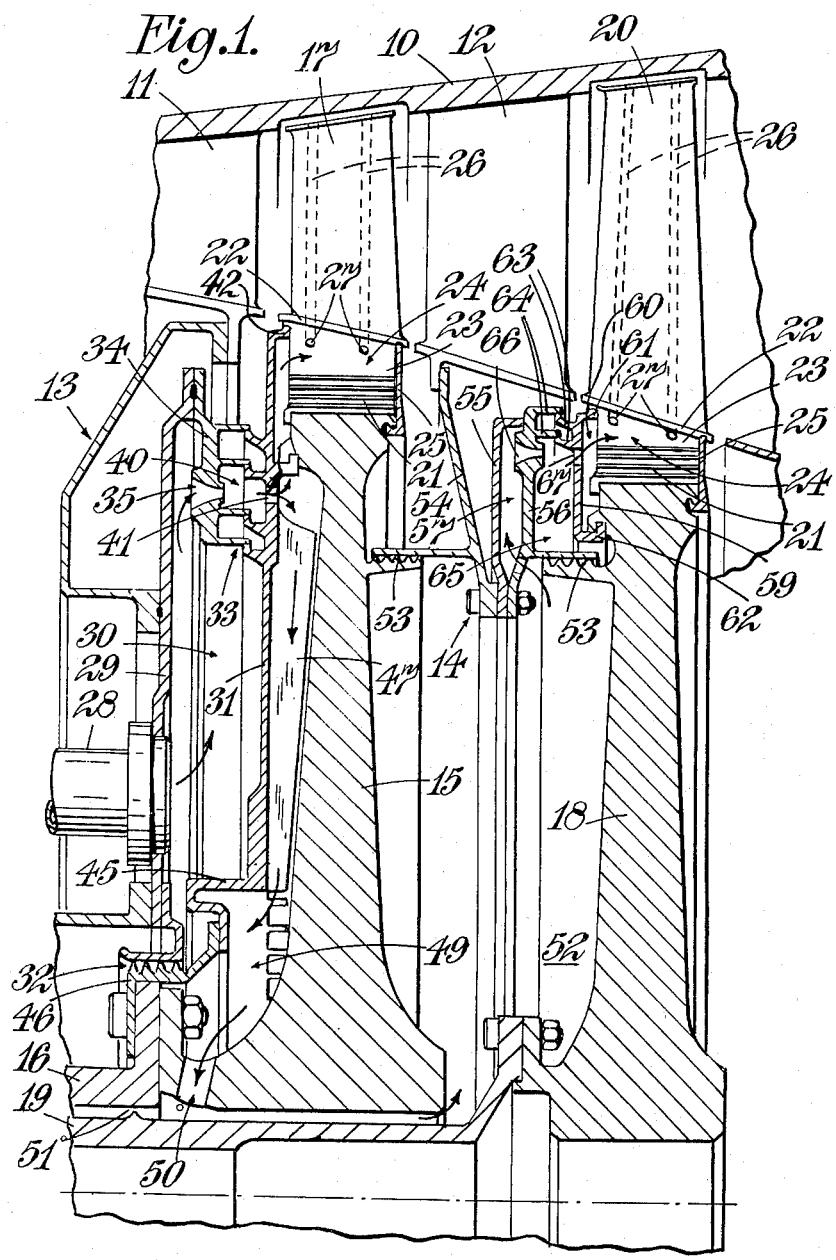

June 13, 1961

L. G. DAWSON 2,988,325

ROTARY FLUID MACHINE WITH MEANS SUPPLYING
FLUID TO ROTOR BLADE PASSAGES

Filed July 7, 1958

2 Sheets-Sheet 1

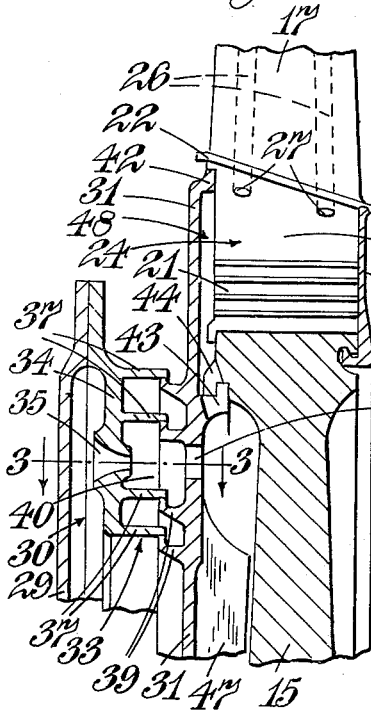
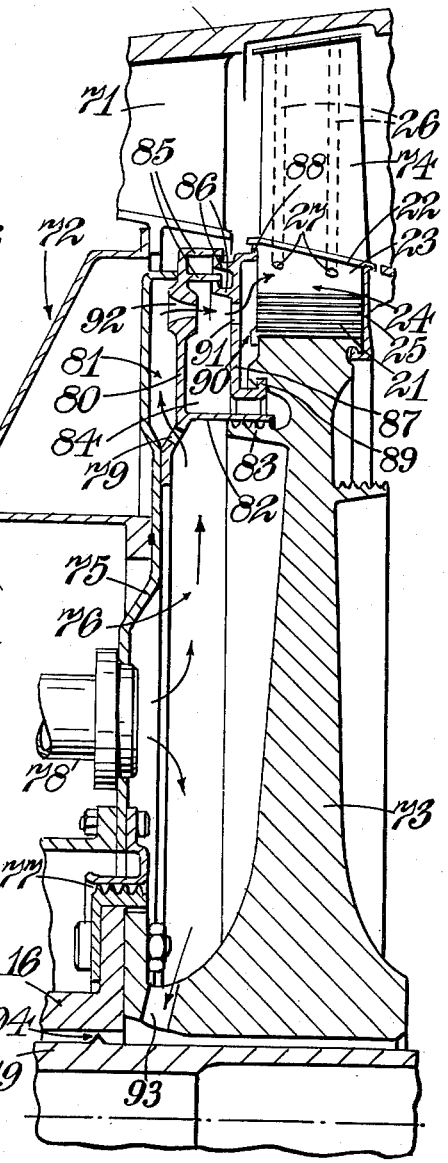
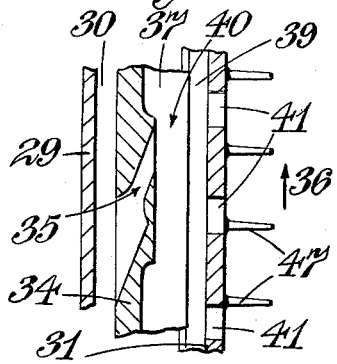

United States Patent Office 2,988,325
Patented June 13, 1961

2,988,325
ROTARY FLUID MACHINE WITH MEANS SUPPLYING FLUID TO ROTOR BLADE PASSAGES
Lindsay Grahame Dawson, Castle Donington, England, assignor to Rolls-Royce Limited, Derby, England, a British company
Filed July 7, 1958, Ser. No. 746,870
Claims priority, application Great Britain July 18, 1957
7 Claims. (Cl. 253—39.15)

This invention comprises improvements in or relating to fluid machines having bladed rotors, such for instance as gas turbines.

It is often desirable to provide the blades of the rotor of such a machine with internal passages to which a fluid is supplied in operation of the machine. For instance in the case of gas turbines, it is of advantage to provide internal passages in the rotor blades of the turbine to which passages a coolant gas, such as air in which a liquid may be sprayed to increase its coolant properties, is supplied, thereby enabling the working gas temperature to be increased or enabling the blades to be made from a material which could not otherwise be employed.

This invention has for an object to provide improved means for supplying a fluid to internal passages in the rotor blades of a fluid machine.

According to the present invention, in a fluid machine having a bladed rotor whereof its blades are provided with internal fluid-conveying passages, the passages have inlets opening into a manifold space formed within the rotor, and the machine comprises stationary structure affording a pressure fluid supply manifold which has outlets therefrom in the form of nozzles which direct jets of fluid towards inlet ports formed in a wall of the manifold space of the rotor.

Preferably, the rotor and the stationary structure define between them a chamber outflow from which is restricted by running seals, say of the labyrinth type, and the nozzles are arranged to direct the jets across this chamber to the inlet ports.

Preferably, moreover, the nozzle axes are directed to impart a component of velocity to the fluid jets in the direction of rotation of the rotor.

Two construction of fluid machine embodying the invention will now be described with reference to the accompanying drawings, in which—

FIGURE 1 is an axial section through one construction,
FIGURE 2 is a part of FIGURE 1 drawn to a larger scale,
FIGURE 3 is a section on the line 3—3 of FIGURE 2, and
FIGURE 4 illustrates the second construction.

Referring first to FIGURES 1 to 3, there is illustrated a two-stage axial-flow gas turbine. The turbine comprises a stator casing 10 supporting two sets of nozzle guide vanes 11, 12 which extend across the working gas passage of the turbine, stator structure 13 radially within the ring of guide vanes 11, interstage stator structure 14 radially within the guide vanes 12 and supported thereby, and rotor means.

The rotor means comprises a high-pressure rotor disc 15 which is secured on a shaft 16 and which carries at its periphery a ring of high-pressure rotor blades 17, and an independently-rotating rotor disc 18 which is secured on a shaft 19 and which carries at its periphery low-pressure rotor blades 20.

The rotor blades 17, 20 are of similar construction and each blade has a root portion comprising a shouldered attachment portion 21 which engages a correspondingly shaped channel in the periphery of the supporting rotor disc 15, 18, a platform 22 which together with the platforms of the remaining blades in the ring forms part of the inner wall of the working gas passage of the turbines, and a stem portion 23 interconnecting the platform 22 and the shouldered portion 21. The stems 23 are of smaller circumferential dimension than the platforms 22 and thus there is formed between each pair of blades an axially-extending tunnel 24. The downstream ends of the tunnels 24 are closed-off by blanking members 25 mounted on the disc periphery and abutting the downstream faces of the disc periphery and of the root portions of the blades. Each blade is also provided with internal fluid-conveying passages 26 having inlets 27 thereto opening into the tunnels 24, and outlets therefrom passing through the tips of the blades.

The turbine also comprises means to supply air under pressure to the passages 26 during operation of the turbine.

The pressure air supply means comprises an air supply duct 28 mounted in the stationary structure 13 and opening through a diaphragm member 29 into a manifold space 30 defined between the diaphragm 29 and an annular plate 31 mounted on the upstream face of the turbine disc 15. Excessive outflow of pressure air from the space 30 is prevented by labyrinth seal structures 32, 33 between the inner and outer radii of the plate 31 and the stationary structure 13.

The diaphragm member 29 has welled to it at its outer periphery a ring 34 which lies between the diaphragm member 29 and the plate 31. The ring 34 has formed in it a ring of nozzles 35, the axes of which, as will best be seen from FIGURE 3, are skewed to the axis of rotation of the turbine so as to impart to pressure air flowing through the nozzles a component of velocity in the direction of rotation of the turbine rotor, which direction is indicated by arrow 36 in FIGURE 3. The ring 34 is provided on its downstream face with a series of four radially-spaced annular webs 37 which project axially towards the upstream face of the plate 31 and which form the stationary elements of the labyrinth seal 33. The plate 31 has on its upstream face a corresponding series of annular ribs 39 which form the rotating elements of the labyrinth seal 33 by co-operating with the webs 37. The co-operating webs 37 and ribs 39 define between them a series of annular chambers, one outside the other, and it is arranged that the nozzles 35 open into the middle chamber 40 and direct jets of air under pressure across the chamber 40 towards a ring of ports 41 formed in the plate 31.

The plate 31 co-operates with the upstream face of the high-pressure turbine disc 15 to form in the rotor a pressure air distribution space. The plate 31 extends radially from adjacent the hub of the disc 15 to adjacent the platforms 22 of the blades 17 and has at its outer edge a bead 42 which abuts the upstream faces of the stems 23, a series of circumferentially-spaced hooked projections 43 which interlock with corresponding projections 44 provided on the rotor disc 15 adjacent its periphery, and an axial flange 45 (FIGURE 1) at its inner edge, which flange has an inturned portion to which is secured the rotating element 46 of the labyrinth seal 32. The rotating element 46 is in the form of a ring and is bolted on to the shaft 16. The plate 31 also has on its downstream face a series of radially-extending vanes 47 which extend from the inner edge of the plate 31 outwardly to just radially short of the inlet ports 41.

The pressure air flowing from the nozzles 35 across the chamber 40 and through the ports 41 divides into two streams. The first stream flows radially outwards between the plate 31 and disc 15 into an annular manifold space 48 between the outer portion of the plate 31 and the blade roots. The air is then distributed from the manifold space 48 into the tunnels 24 and thence passes through the inlets 27 into the passages 26 in the blade 27.

The second stream of air flows radially inwards between the vanes 47 into an annular space 49 adjacent the hub of the rotor disc 15 and flows from this space through holes 50 in the rotor disc to within the bore of the disc. A labyrinth seal 51 is provided between the shafts 16 and 19 to prevent excessive flow of air in the upstream direction from the bore of the disc 15 and the greater part of the pressure air flowing into the bore of the disc flows rearwardly outside the shaft 19 into a space 52 defined between the downstream face of the outer disc 15 and the upstream face of the rotor disc 18. The space 52 is closed-off at its outer radius to prevent excessive leakage therefrom by means of labyrinth seals 53 forming part of the inter-stage stator structure 14.

The inter-stage stator structure 14 comprises a diaphragm 54 which is secured at its outer edge to the inner ends of the second stage nozzle guide vanes 12 and which has secured to its inner edge a pair of radially-outwardly-extending rings 55, 56. The rings 55, 56 co-operate to form a stationary manifold 57. The pressure air in space 52 enters the manifold 57 through a ring of holes 58 in the ring 56.

A ring 59 is secured to the upstream face of the periphery of disc 18 and co-operates with the disc periphery and with the roots of the blades 20 to define a pressure air distribution manifold space 60 internally of the rotor structure, which space 60 communicates with the passages 26 in the blades 20. The ring 59 has at its outer edge a flange 61 which co-operates with the blade roots adjacent the platforms 22, a flange 62 which inter-engages with a portion of the disc periphery to locate the ring in position on the disc periphery, and a pair of radially-spaced annular ribs 63 which project axially towards and co-operate with a corresponding pair of webs 64 on the ring 56 to form a labyrinth seal.

The rings 56, 59, the labyrinth seal 53 and the labyrinth seal 63, 64 define between them a closed annular chamber 65 across which jets of pressure air are directed by a series of nozzles 66 which form the outlets from the stationary manifold 57. The nozzles 66 are similar to the nozzles 35 and the jets of air issuing from them are directed towards inlet ports 67 for the manifold space 60 with a component of velocity in the direction of rotation of the rotor.

The air entering the manifold space 60 of the rotor through the ports 67 is distributed into the tunnels 24 between the stems 23 of the blades 20 and then flows from these tunnels through inlets 27 into the passages 26 in the blades 20 and leaves the blades through their tips.

Referring now to FIGURE 4, there is illustrated an alternative arrangement suitable for supplying pressure air to the high-pressure stage of a multi-stage turbine.

The turbine casing is indicated at 70 and the casing carries a ring of inlet nozzle guide vanes 71 and stator structure 72 is provided radially within the ring of nozzle guide vanes 71.

The turbine also comprises a rotor disc 73 carrying a ring of blades 74 which are of similar construction to the blades 17 and 20 above described and are mounted on the periphery of the rotor disc 73 in a similar way.

Pressure air is supplied to the passages 26 in the blades 74 in the following way.

The stator structure 72 comprises a radially-extending diaphragm member 75 which defines with the upstream face of the disc 73 a substantially-closed space 76, excessive outflow from which is prevented at inner radius by a labyrinth seal 77. A pressure air supply pipe 78 is mounted in the diaphragm member 75 and opens to the space 76.

A first stream of the pressure air fed to the space 76 flows radially outwards and passes through ports 79 into a manifold space 81 formed between the outer portion of the diaphragm member 75 and a ring 80 which is secured to the diaphragm member.

The ring 80 has adjacent its inner edge but radially outside the ports 79 an axial flange 82 which co-operates with a ribbed flange 83 on the disc 73 to form a labyrinth seal between the space 76 and a chamber 84 on the downstream side of the ring 80.

Excessive outflow from the chamber 84 at its outer radius is prevented by means of a labyrinth seal formed by radially-spaced axial flanges 85 on the ring 80 and annular ribs 86 on a further ring member 87 which is secured to the uupstream side of the disc periphery.

The ring 87 has at its outer edge a short axial flange 88 which abuts the blade roots adjacent the platforms 22 and has at its inner edge a flange 89 inter-locking with the disc periphery so as to retain the ring 87 in position.

The ring 87 defines with the disc periphery and the root portions of the blades 26 a manifold space 90 having inlets 91 thereto from the chamber 84 towards the inlets 91 from the stationary manifold 81 by outlet nozzles 92. The nozzles 92 are similar to the nozzles 35 and 66 above described and impart to the jets of air directed towards the inlets 91 a component of velocity in the direction of rotation of the rotor 73.

A second portion of the air entering the space 76 flows radially inwards and passes from this space through holes 93 in the hub of the disc to enter the bore of the disc and part of the air then flows rearwardly through the bore, upstream flow being restricted by means of a labyrinth seal 94 provided between the turbine shafts 16 and 19 as in the previously described construction.

The air flowing from the bore of the disc 73 may be employed to supply cooling air to rotor blades of a second stage of the turbine in a manner as described with reference to FIGURE 1.

I claim:

1. A fluid machine comprising a stator structure and a rotor structure rotatively mounted in the stator structure, a ring of radially-extending rotor blades having internal passages for cooling air flow, each said blade being secured by its radially inner end to the rotor structure at its periphery, said rotor structure including parts together defining a manifold space which is within said rotor structure and adjacent the radially inner ends of the blades, said manifold space communicating with said internal passages of the blades, one of said parts forming an external surface of the rotor structure and having in it a ring of inlets leading to said manifold space from said external surface of the rotor structure, rotating annular seal elements on the external surface of said rotor structure radially on each side of said ring of inlets, a ring member forming a part of the stator structure and having formed therein a series of angularly-spaced nozzles having inlets facing away from said ring of inlets and outlets facing towards said ring of inlets, means delivering compressed air to the inlets of said nozzles and stationary annular seal elements extending from the ring member radially on each side of said nozzles and cooperating with said rotating seal elements and with the ring member and the external rotor surface to define a sealed chamber across which the nozzles direct jets of air to said ring of inlets.

2. A fluid machine according to claim 1 wherein the nozzle axes are skewed with respect to the axis of rotation of the rotor structure to impart a component of velocity to the air jets in the direction of rotation of the rotor structure.

3. A fluid machine according to claim 1, said stationary structure comprising a diaphragm axially-spaced from said external surface of the rotor structure and extending radially from adjacent the centre of the rotor structure to adjacent the inner ends of the blades, the ring member and the diaphragm being secured together at their peripheries, and the ring member extending radially inwards from the periphery of the diaphragm and axially between the diaphragm and the rotor structure and in axially-spaced relation to both the diaphragm and the rotor structure, said means delivering compressed air including a supply conduit mounted on the diaphragm and opening to the space between the diaphragm and the rotor structure, and cooperating running seal parts on the rotor structure and on the diaphragm adjacent their centres forming a running seal to prevent excessive fluid leakage from the space between the diaphragm and the rotor structure.

4. A fluid machine according to claim 3, wherein said parts of the rotor structure are a main disc carrying the blades at its periphery and an annular member attached to and co-operating with the periphery of the main disc on the side thereof adjacent the diaphragm to form the manifold space internally of the rotor structure, the annular member having the inlet holes formed therein.

5. A fluid machine according to claim 4, wherein said annular member is a plate which extends radially inwards to adjacent the centre of the main disc in axially-spaced relation thereto, is provided on its surface adjacent the main disc with radial vanes extending inwards from the inlet holes, and its inner part carries the rotating part of the centre running seal thereby to provide an air path leading to holes for feeding air to a central bore in the main disc.

6. A fluid machine according to claim 1, said stator structure comprising a ring of guide vanes upstream of rotor blades, a radially-extending ring radially within said ring of guide vanes, said radially-extending ring and said ring member having the nozzles being in axially-spaced relation and being joined together at their edges and forming a manifold space feeding the inlets of the nozzles, and said radially-extending ring and said ring member having the nozzles being supported by the guide vanes.

7. A fluid machine according to claim 6, wherein said parts of the rotor structure are a blade-carrying disc and a ring attached to the disc and co-operating with the disc periphery to form the manifold space feeding the blade passages, the ring forming a wall of the sealed chamber and having the inlet holes in it.

References Cited in the file of this patent

UNITED STATES PATENTS

| | | |
|---|---|---|
| 2,438,998 | Halford | Apr. 6, 1948 |
| 2,647,368 | Triebbnigg | Aug. 4, 1953 |
| 2,848,193 | Sells et al. | Aug. 19, 1958 |

FOREIGN PATENTS

| | | |
|---|---|---|
| 139,969 | Australia | Jan. 18, 1951 |
| 383,506 | Germany | Oct. 13, 1923 |
| 858,334 | Germany | Dec. 4, 1952 |
| 1,017,514 | France | Sept. 24, 1952 |